United States Patent [19]

Carlin et al.

[11] 4,066,124
[45] Jan. 3, 1978

[54] SALINITY TOLERANT SURFACTANT OIL RECOVERY PROCESS

[75] Inventors: Joseph T. Carlin, Houston, Tex.; James W. Ware, Tulsa, Okla.; Melvin E. Mills, Jr., Salem, Ill.; John A. Wells, Houston, Tex.

[73] Assignee: Texaco Inc., New York, N.Y.

[21] Appl. No.: 746,554

[22] Filed: Dec. 1, 1976

[51] Int. Cl.² ............................................. E21B 43/22
[52] U.S. Cl. .................................. 166/252; 166/273; 166/275; 252/8.55 D
[58] Field of Search ............... 166/252, 273, 274, 275, 166/305 R; 252/8.55 D

[56] References Cited

U.S. PATENT DOCUMENTS

| 3,302,713 | 2/1967 | Ahearn et al. | 166/274 |
|---|---|---|---|
| 3,307,628 | 3/1967 | Sena | 166/274 |
| 3,348,611 | 10/1967 | Reisberg | 166/275 |
| 3,508,612 | 4/1970 | Reisberg et al. | 166/275 X |
| 3,811,504 | 5/1974 | Flournoy et al. | 166/274 X |
| 3,811,505 | 5/1974 | Flournoy et al. | 166/274 |
| 3,811,507 | 5/1974 | Flournoy et al. | 166/274 |
| 3,858,656 | 1/1975 | Flournoy et al. | 166/274 |
| 3,916,997 | 11/1975 | Douglas et al. | 166/252 X |
| 3,920,073 | 11/1975 | Holm | 166/274 |
| 4,016,932 | 4/1977 | Kalfoglou | 166/275 X |

Primary Examiner—Stephen J. Novosad
Assistant Examiner—George A. Suchfield
Attorney, Agent, or Firm—Carl G. Ries; Thomas H. Whaley; Jack H. Park

[57] ABSTRACT

Primary anionic surfactants such as organic sulfonates are effective for recovering oil from subterranean formations only if the salinity and/or hardness of the formation water is relatively low. In petroleum formations containing high salinity, or hard water, either the high salinity water must be displaced by a preflush or the primary anionic surfactant must be used in conjunction with an effective solubilizing co-surfactant, such as ethoxylated alcohols or alkyl phenols, or alkyl or alkylaryl thiols, as well as sulfated or sulfonated, ethoxylated alcohols or alkyl phenols. Optimum performance is achieved if two or more samples of petroleum sulfonate having different equivalent weight ranges and distributions are blended in a ratio which requires the minimum amount of solubilizing cosurfactant to achieve a condition of borderline solubility in the particular formation water in which the surfactants are to be employed. This ratio may be identified by preparing a number of blended petroleum sulfonate samples in the formation water using different ratios of total primary surfactant concentration to solubilizing co-surfactant concentration, and determining whether borderline solubility is achieved, by direct observation or by identifying the sample which produced the minimum electrical conductivity, or at which point the conductivity vs. concentration ratio curve exhibits an inflection point.

23 Claims, 2 Drawing Figures

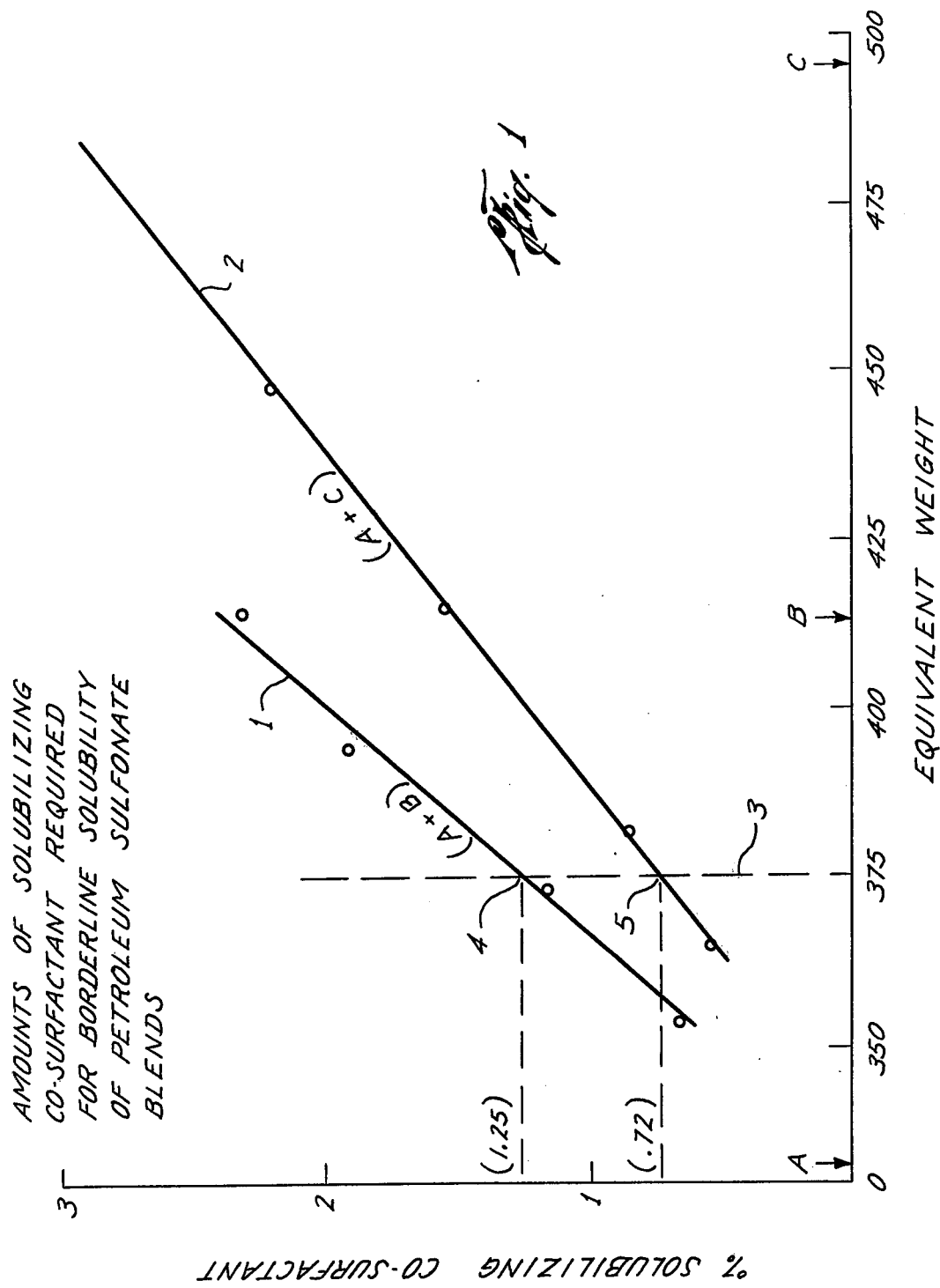

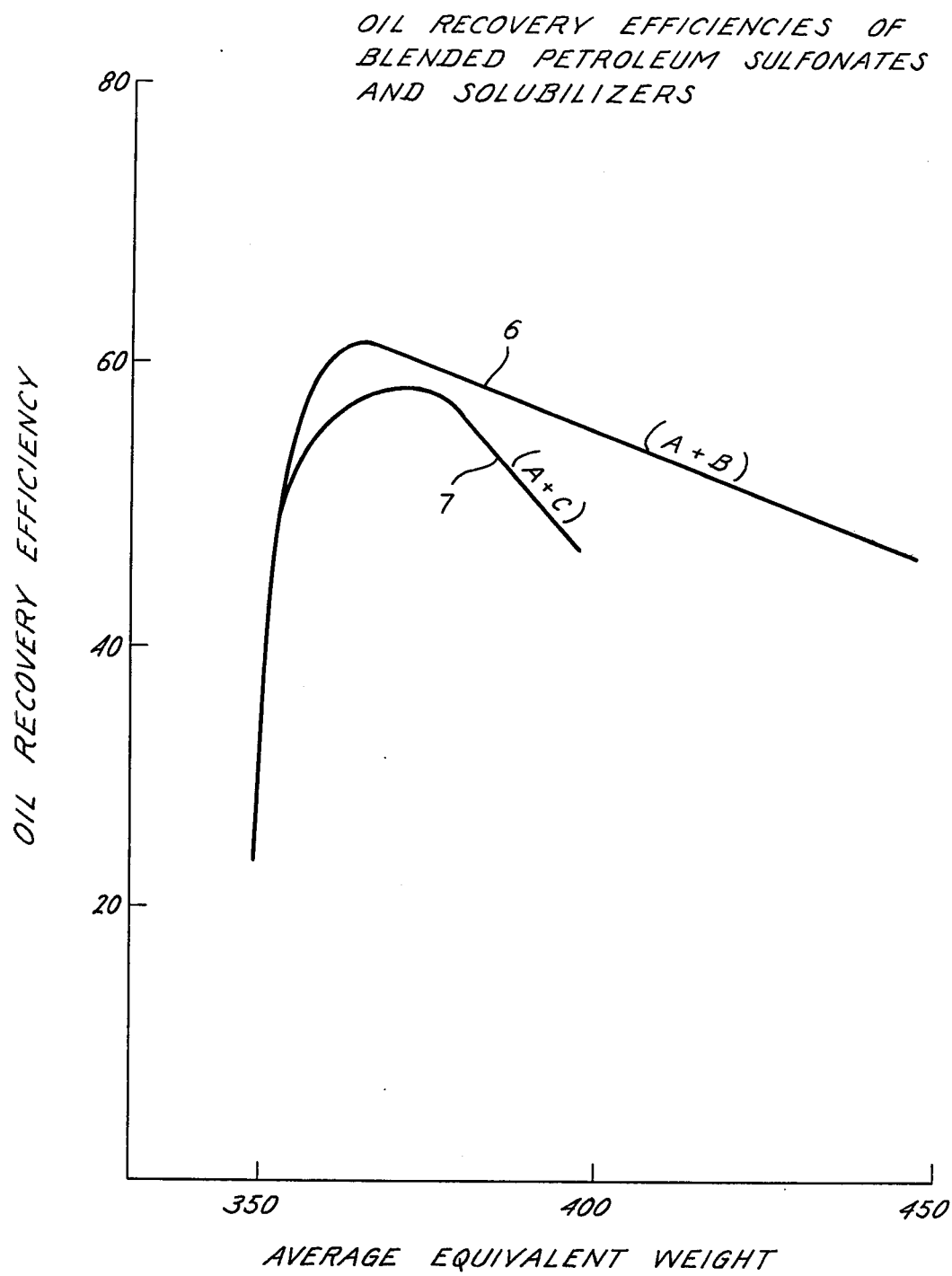

SALINITY TOLERANT SURFACTANT OIL RECOVERY PROCESS

BACKGROUND OF THE INVENTION

1. Field of the Invention

This invention concerns an enhanced oil recovery process and more specifically, a surfactant flooding oil recovery process. Still more specifically, this invention is concerned with an oil recovery process usable in subterranean oil formations containing water having abnormally high salinities and/or concentrations of divalent ions such as calcium and magnesium by the use of a critical blend of two or more primary anionic surfactants differing in equivalent weight distribution and one or more solubilizing co-surfactants.

2. Description of the Prior Art

Petroleum is normally recovered from subterranean formations in which it has accumulated by penetrating the formation with one or more wells and pumping or permitting the petroleum to flow to the surface through these wells. Recovery of petroleum from formations is possible only if certain conditions exist in the formation. The petroleum must be present in the formation in an adequately high concentration, and there must be sufficient permeability or interconnected flow channels within the formation to permit the flow of fluids therethrough if sufficient pressure is applied to the fluids. When the formation has natural energy present in the form of an underlying active water drive, or gas dissolved in the petroleum which can exert pressure to drive the petroleum to the producing well, or a high pressure gas cap above the petroleum-saturated portion of the formation, this natural energy may be utilized to recover petroleum. Recovery of petroleum by use of natural energy as described above is referred to as primary recovery. When this natural energy source is depleted, or in those instances where the formation does not contain sufficient natural energy to support primary recovery, some form of supplemental oil recovery or enhanced oil recovery process must be applied to the formation in order to extract petroleum therefrom. Supplemental recovery is sometimes referred to in the art as secondary or tertiary recovery, although in fact it may be primary, secondary or tertiary in sequence of employment.

Water flooding, which involves the injection of water into the subterranean, petroliferous formation for the purpose of displacing petroleum toward the producing well, is the most economical and widely practiced supplemental recovery method. Water does not displace petroleum with high efficiency, however, since water and oil are immiscible, and also because the interfacial tension between water and oil is quite high. Persons skilled in the art of oil recovery have recognized this inherent weakness in water flooding and many additives have been described in the literature for decreasing the interfacial tension between the injected water and the formation petroleum. For example, U.S. Pat. No. 2,233,381 (1941) discloses the use of polyglycol ethers as surface active agents or surfactants to increase the capillary displacement efficiency of an aqueous flooding medium. U.S. Pat. No. 3,302,713 discloses the use of petroleum sulfonates prepared from a specific boiling range fraction of the petroleum feed stock as a surfactant in oil recovery operation. Other surfactants which have been proposed for oil recovery operations include alkylpyridinium salts, alkyl sulfates, alkylaryl sulfates, ethoxylated alkyl or alkylaryl sulfates, alkyl sulfonates, alkylaryl sulfonates, and quaternary ammonium salts.

The above described surfactants are satisfactory in formations where the salinity and/or concentration of divalent ions in the formation water is relatively low. Generally, the salinity must be less than about 5,000 parts per million and the concentration of divalent ions must be less than about 200 to about 500 parts per million in order to permit the use of the most commonly available primary anionic surfactants such as petroleum sulfonate or other organic sulfonates.

Persons skilled in the art have recognized the limitation of single anionic surfactants such as petroleum sulfonate and have described the use of certain solubilizing co-surfactants therewith. U.S. Pat. Nos. 3,811,504; 3,811,505; and 3,811,507 describe mixtures of alkyl or alkylaryl sulfonates which exhibit satisfactory performance in petroleum formations having high salinity and/or hard water. U.S. Pat. No. 3,508,612 (1970) describes the use of a dual surfactant system comprising an organic sulfonate such as a petroleum sulfonate and a sulfated, ethoxylated primary or secondary alcohol, which is compatible with high salinity and/or high divalent ion containing formation waters. U.S. Pat. Nos. 3,827,497 and 3,890,239 relate to oil recovery fluids and processes which are compatible with high salinity formation waters and involve mixtures containing organic sulfonate and sulfonated, ethoxylated alcohols.

While the aforementioned multi-component systems can be rendered soluble in high salinity and/or high divalent ion concentration formation waters, their use has not always been satisfactory because the ratio of the concentrations of the primary anionic surfactant and the solubilizing co-surfactant is extremely critical and varies with the salinity, divalent ion concentration, as well as with the specific surfactants being employed. If too little solubilizing surfactant is used, the primary anionic surfactant precipitates in the presence of the high salinity water. If too much solubilizing surfactant is used, the material is rendered so soluble in water that its effectiveness for purpose of reducing the interfacial tension between the drive water and the formation petroleum is greatly reduced. In either case, oil recovery falls off sharply. Moreover, the cost of the solubilizing co-surfactant is generally two to five times as great as the cost per pound of the primary anionic surfactants and the use of excessive amounts of solubilizing co-surfactant renders an oil recovery process economically unattractive.

U.S. Pat. No. 3,916,997 (1975) described the use of an oil-external micellar dispersion wherein the concentration of surfactant and alcohol used as a solubilizer are varied to produce a fluid having an electrical conductivity above a specified value.

In view of the foregoing discussion, it can be appreciated that there is a substantial unfulfilled commercial need for an efficient and economical petroleum recovery method applicable to oil formations containing high salinity and/or high divalent ion concentration.

SUMMARY OF THE INVENTION

The present invention concerns a petroleum recovery process usable in formations containing water having high salinities, e.g. total dissolved solids in excess of 5000 parts per million and/or high concentrations of divalent ions such as calcium and/or magnesium e.g. greater than about 200 parts per million. The surfactant system comprises at least two surfactants:

1. a mixture of two or more primary anionic surfactants, specifically a blend of two or more organic sulfonates such as petroleum sulfonate or a synthetic alkyl or alkylaryl sulfonate at least one of the organic sulfonate anionic surfactant differs from the other organic sulfonate in that it's average equivalent weight is from 10 to 60 percent less and preferably from 35 to 55 percent less than the first organic sulfonate.
2. a solubilizing co-surfactant which renders the primary anionic surfactant soluble in the particular high salinity and/or high divalent ion concentration formation water, and which may be any one of the following surfactants or mixtures thereof.
   a. a non-ionic surfactant such as an ethoxylated aliphatic compound or an ethoxylated alkylaryl compound
   b. a non-ionic mercaptain-related surfactant such as an ethoxylated alkyl or alkylaryl thiol;
   c. an alkyl or alkylaryl polyalkoxy alkyl sulfonate compound having the following structure:

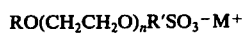

wherein R is an alkyl or alkylaryl group having from 8 to 20 carbon atoms,
   $n$ is an integer from 1 to 20
   R' is ethyl, propyl or hydroxypropyl,
   $SO_3$ represents the sulfonate radical, and
   $M+$ is a monovalent cation such as sodium, potassium or ammonium; and
   d. an alkyl or alkylaryl polyethoxy sulfate surfactant having the following general structure:

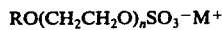

wherein R, $n$ and $M+$ have the same meaning as in (c) above.

Among other factors, the ratio of the two or more organic sulfonates and the choice of solubilizing co-surfactant are influenced by formation water salinity, divalent ion concentration, and formation temperature.

At least one of the organic sulfonates should be predominantly water soluble and have an average equivalent weight less than 400 and preferably less than 350, while at least one other of the organic sulfonates should be at least partially oil soluble and preferably part oil soluble and part water soluble. The average equivalent weight of the second organic sulfonate should be greater than 400 and preferably greater than 450, and the average equivalent weight should also be less than 600 and preferably less than 550.

There are many different petroleum sulfonates available commercially, differing from one another in their average equivalent weight as well as in the range and distribution of equivalent weight. Whenever as many as three different petroleum sulfonates are available, there are three possible combinations of two materials, and the essence of our invention concerns a method for identifying the optimum combination, both as to selection of components and weight ratio of the components, which result in the maximum oil recovery and requires the least possible amount of solubilizing co-surfactant for efficient operation in any particular formation water being used for the tests.

The particular organic sulfonates to use in making the blend, as well as the weight percentages of the two or more anionic organic sulfonate primary surfactants and the solubilizing co-surfactant, are carefully chosen so the surfactants are slightly soluble or exhibit borderline solubility using the minimum amount of solubilizing co-surfactants in the particular field water in which the surfactants are to be employed, which preferably has about the same salinity and hardness as the formation water present in the petroleum formation into which the surfactant fluid is to be injected. The ratio of the two or more organic sulfonates is adjusted so as to require the minimum quantity of solubilizing co-surfactant to be mixed therewith to achieve the desired condition of borderline solubility. This ratio results in excellent oil recovery and ensures the minimum chemical cost.

The concentrations of surfactants which produce the desired condition of borderline solubility are determined by preparing a series of samples containing various concentrations of the two or more primary anionic surfactants and the solubulizing co-surfactant dissolved in actual samples of formation or field water to be employed in the field project, and measuring the electrical conductivity of the samples. The electrical conductivity is plotted as a function of the ratio, and the point on the electrical conductivity vs. concentration ratio curve having a minimum value and/or an inflection point is identified. The concentration ratio corresponding to this inflection and/or minimum point is the ratio yielding borderline solubility of the multi-component surfactant composition in that particular brine and is the preferred concentration ratio to be employed in the oil recovery process.

By preparing several mixtures of organic sulfonates and determining the minimum amount of solubilizing co-surfactant to achieve borderline solubility for each blend of organic sulfonates, the blend requiring the minimum amount of solubilizing co-surfactant may be identified. This blend is then used for surfactant flooding oil recovery in the formation for which the study was made.

BRIEF DESCRIPTION OF THE DRAWINGS

FIG. 1 illustrates the percent of solubilizer required for two blends of two different petroleum sulfonate samples required to achieve borderline solubility showing how two blends of different materials require significantly different amounts of solubilizing co-surfactant even though the equivalent weights of the two blends are equal.

FIG. 2 illustrates the oil recovery efficiencies for a series of runs using different blends of petroleum sulfonate and the amount of solubilizing co-surfactant required to achieve a condition of borderline solubility for each blend.

DETAILED DESCRIPTION OF THE PREFERRED EMBODIMENTS

Our oil recovery process involves a carefully balanced multi-component surfactant system which will be comprised of the following types of surfactants.

1. a blend of at least two primary anionic surfactants, preferably an organic sulfonate such as a petroleum sulfonate, or a synthetic alkyl or alkylaryl sulfonate; and
2. A solubilizing co-surfactant which may be comprised of one or more of the following types of compounds:
   a. a non-ionic surfactant such as an ethoxylated alcohol or an ethoxylated alkylaryl compound,
   b. a non-ionic mercaptain-related surfactant such as an ethoxylated alkyl or arlkylaryl thiol;
   c. an alkyl or alkylaryl polyethoxy alkyl sulfonate having the following formula:

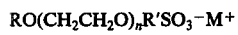

wherein R is an alkyl or alkylaryl group having from 8 to 20 carbon atoms, in the alkyl chain, $n$ is an integer from 1 to 20

R' is ethyl, propyl or hydroxypropyl, $SO_3$ represents the sulfonate radical, and $M^+$ is a monovalent cation such as sodium, potassium or ammonium; and d. an alkyl or alkylaryl polyethoxy sulfate surfactant having the following general formula:

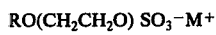

wherein R, $n$ and $M^+$ have the same meaning as in (c) above.

Petroleum sulfonate is a particularly desirable primary surfactant for oil recovery purposes because it is readily available, comparatively inexpensive and quite effective under certain conditions for recovering petroleum from subterranean, petroleum-containing formations. Petroleum sulfonate is, unfortunately, insoluble in water having salinities greater than about 5000 parts per million total dissolved solids, and/or more than about 500 parts per million divalent ions which are generally calcium and/or magnesium. If a normally water soluble petroleum sulfonate is added to a brine having greater salinity and/or divalent ion concentration than the above-identified limits, the petroleum sulfonate is insoluble and will precipitate and ultimately settle out of the solution, forming a layer usually under the aqueous solution. If such a fluid were injected into a subterranean, permeable oil formation, little interfacial tension reduction would be accomplished because the petroleum sulfonate is not soluble in the aqueous fluid in which it is injected; moreover, there is a considerable probability that plugging of at least some of the small capillary flow channels in the oil formation would occur. Accordingly, either a different surfactant must be utilized, which is at least slightly soluble in the formation water in which the fluid is to be injected, or another material must be added to the surfactant fluid which will have the effect of increasing the solubility of the primary anionic surfactants, e.g., petroleum sulfonate or other organic sulfonate in the presence of the high salinity and divalent ion-containing formation water. Alcohols are sometimes employed for this purpose, although they have only limited effectiveness and, additionally, it is preferable to utilize a material which is itself a surface active agent and so is capable of reducing the interfacial tension between the formation petroleum and the injected drive water.

Any of the above-identified four general classes of solubilizing co-surfactants may be combined with organic sulfonates such as petroleum sulfonate, and when a proper ratio is achieved between the concentration of the organic sulfonate and the solubilizing co-surfactant, the organic sulfonate is rendered soluble in the presence of high salinity and/or high divalent ion-containing formation water and so can effectively reduce the interfacial tension between oil and water and thereby recover substantial amounts of oil from a formation through which the aqueous surfactant solution is passed.

The choice of solubilizing co-surfactant is influenced by the formation water salinity and divalent ion concentration and by the formation temperature. The ethoxylated alcohols and thiols are effective up to salinities of about 20,000 to 50,000 parts per million total dissolved solids and in formations whose temperatures are as high as 100°–150° F. The alkyl or alkylaryl polyethoxy sulfates are effective in higher salinities, up to 200,000 parts per million, but hydrolyze at temperatures above 150° F. The alkyl or alkylaryl or polyethoxyalkyl sulfonates are tolerant of both very high salinities and high temperatures.

We have found that the degree of solubility of the surfactant composition in the field water is extremely critical to the oil recovery efficiency in the process. If the surfactant is much more soluble in water than oil, then the surfactants tends to be distributed throughout the bulk of the water phase including both formation water and injected drive water, and little effectiveness will be achieved at the interfacial zones between oil and water. Similarly, if the surfactant is substantially more soluble in oil than it is in water, the surfactant will partition into and distribute itself throughout the oil phase, and will have little effect on the surface tension existing at the interfacial zone between oil and water. The optimum surfactant effectiveness is achieved if there is a condition of borderline solubility of the surfactant fluid in the drive water and/or formation water, so the surfactants tend to exist in higher concentrations at the interfacial zone between oil and water than in either the oil phase or the water phase.

We have found that when using blends of organic sulfonates such as petroleum sulfonates and one or more solubilizing co-surfactants such as those enumerated above, the optimum oil recovery efficiency occurs when the concentrations of the materials are carefully balanced so as to produce a condition of borderline solubility. If too little solubilizing co-surfactant is used in combination with the primary anionic organic sulfonates, not all of the primary surfactants are rendered soluble and at least a portion thereof will precipitate in the aqueous solution. This can, as discussed above, result in at least reducing the effectiveness of the surfactant fluid for the purpose of recovering oil, and may lead to permanent, irreversible damage to permeability of the formation matrix, which will prevent any further displacement of petroleum from the formation. On the other hand, if more than the minimum amount of solubilizing co-surfactant which achieves the conditions which we have described above as borderline solubility is used in combination with the primary anionic blended organic sulfonate surfactants, the surfactants are rendered too soluble in the aqueous phase and the amount of oil displaced by such a solution being injected into a formation is reduced fairly substantially. Moreover, since the cost of the solubilizing co-surfactants is generally from two to five times the cost of the primary anionic organic sulfonate surfactant, the result of using too much solubilizing co-surfactant is that the fluid cost is increased and the amount of oil recovered by the use of the fluid is decreased, with rapidly diminishing economic attractiveness of the process.

The amount of solubilizing co-surfactant necessary to achieve the above-described desired condition of borderline solubility is highly dependent on all of the possible variations in the structural characteristics of the surfactant molecules employed. The average equivalent weight of the anionic primary organic sulfonate surfactant, for example will affect the amount of solubilizing co-surfactant required to achieve the condition of borderline solubility. In the instance of using alkyl or alkylaryl polyethoxy sulfates or sulfonates as solubilizing co-surfactants, any change in the length of the alkyl chain which comprises the hydrophobe of the surfactant molecule, or a change in the number of ethylene oxide groups condensed with the molecule, will change the amount of that solubilizing co-surfactant needed to achieve the condition of borderline solubility with whatever primary anionic surfactant or mixture thereof it is used. Furthermore, the aqueous fluid salinity and the concentration of divalent ions present in the fluid will also vary the amount of the surfactants needed to achieve borderline solubility. Generally, higher salinity and/or higher concentrations of divalent ions of the aqueous fluid is which the surfactants are dissolved require increasing numbers of ethylene oxide units to be present on the solubilizing co-surfactant molecule.

We have found that the only satisfactory method for determining the proper concentrations of primary anionic surfactant and solubilizing co-surfactant involves actually preparing a series of solutions containing the materials being considered for use in a particular application in various concentrations, and determining the ratio of anionic primary surfactant to solubilizing co-surfactant which produces the desired condition of borderline solubility in the particular environment of salinity and hardness in which the surfactants are to be employed in a surfactant flood. It is highly desirable that the surfactant fluid salinity and concentration of divalent ions match the salinity and divalent ion concentration of the formation water as closely as possible, so the surfactants can be tailored to operate in an optimum fashion in that particular aqueous environment.

As a starting point, at least 3 and preferably at least 5 different solutions should be prepared for each blend of two or more organic sulfonates, e.g., petroleum sulfonate, samples to be tested. The total concentration of the blends should be held constant at a value of about 1-2 percent and the concentration of solubilizing co-surfactant varied from about 0.1 to 1.0 percent. Stated another way, the total concentrations should vary between 1 and 3 percent and the weight ratio of solubilizing co-surfactant to primary surfactant blend should be varied between 0.1 and 1.0.

Having compared the series of surfactants in the formation water as described above, the minimum ratio of solubilizing co-surfactant to each primary anionic surfactant blend which results in the desired condition of borderline solubility is determined by either of several procedures.

The samples can be mixed thoroughly and allowed to stand for at least several hours and preferably overnight. Samples containing insufficient solubilizing co-surfactant will separate into two distinct phases; a relatively clear aqueous phase and a separate surfactant-oil phase. Depending on the particular surfactants used, the salinity, and other factors, the clear phase may be on the top or bottom. The first sample in the series (i.e., the sample having the least amount of solubilizing co-surfactant) which does not exhibit two distinct phases is the sample corresponding to borderline solubility. A second or more series of such tests may be made to define the conditions of borderline solubility more precisely. In another method, the samples are placed in a suitable cell and the electrical conductivities of each of the samples are determined. The conductivity is then expressed as a function of the ratio of the concentration and preferably the function is represented graphically. In some instances a sharp minimum value will be identified; whereas in other cases the conductivity function will exhibit a clearly identified inflection point, but the sign of the slope will not necessarily change. In still other situations, an inflection point will occur first as the solubilizer concentration is increased and somewhat later a minimum value will be identified, in which case the inflection point identifies the preferred value. The ratio of surfactants which result in the minimum conductivity or in the occurrence of the first inflection point of the conductivity function, is the ratio which will produce the condition of borderline solubility in the aqueous surfactant fluid, and is also the ratio of surfactants which we have found will achieve the optimum oil recovery in a formation containing water having the salinity and hardness similar to that utilized in the tests.

We have discovered that by preparing a number of samples of blended organic sulfonates such as petroleum sulfonates for example, which organic sulfonates have different average equivalent weights and different equivalent weight ranges and distributions and determining the amount of any preselected solubilizing co-surfactant required to reach the condition of borderline solubility for various ratios of such blended materials, it is possible to identify a preferred blend of organic sulfonates which will achieve the maximum possible oil recovery at the conditions of the test using the least amount of solubilizing co-surfactant. Since the cost of the preferred solubilizing co-surfactants is from three to five times the cost of petroleum sulfonates, the economics are highly favorable when such minimum solublizer-containing fluids are used for a surfactant flooding oil recovery process. The most cost-effective organic sulfonates for use in forming the blend to be used in a particular application are identified by determining which blend requires the minimum amount of solubilizing co-surfactant to achieve a condition of borderline solubility in the field water to be employed in the application, or in an aqueous fluid having about the same salinity and divalent ion concentration the field water to be employed in the particular application. Generally, commercially available samples of petroleum sulfonates have characteristic average equivalent weight values and ranges of equivalent weights which are relatively constant from one batch to another and which are determined by the hydrocarbon feed stocks used to prepare the petroleum sulfonates as well as by the manufacturing processes employed. There are many commercially available products from which the two or more products to blend together may be chosen. Some products are predominantly water soluble, some are predominantly oil soluble and some have varying amounts of oil soluble and water soluble components. While it is taught in the prior art to mix a water soluble and an oil soluble petroleum sulfonate to form a blend which is more effective for oil recovery purposes than either product alone, there are many possible blends of different oil soluble and water soluble petroleum sulfonates possible, some of which produce good results and some of which produce poor results in our process. Moreover, a blend of two particular petroleum sulfonates which yield excellent results in one application may produce poor results in another having significantly different formation water salinity, divalent ion concentration, etc. Finally, different blends may be found which produce equivalent oil recovery efficiencies under a particular set of test conditions but which require significantly different amounts of solubilizing cosurfactant, which causes one system to be much more costly than another.

The method of our invention is best understood by referring to the attached drawing, in which FIG. 1 illustrates the results of a series of tests using various blends of three petroleum sulfonate samples and indicates the amount of solubilizing co-surfactant required to achieve a condition of borderline solubility for each blend in the particular conditions of these tests. In all of the tests on which the curves of FIGS. 1 and 2 were run, the salinity of the water used to prepare the solutions was 110,000 parts per million total dissolved solids including approximately 7600 parts per million divalent ions, principally calcium and magnesium. The solubilizing co-surfactant was a sulfonated, 5 mole polyethoxylated nonyl phenol. Three petroleum sulfonates were used to prepare the two series of blends, designated as A, B and C. The average and ranges equivalent weights of each of these materials was as follows:

TABLE I

| PETROLEUM SULFONATE SAMPLE | AVERAGE EQUIVALENT WEIGHT | RANGE OF EQUIVALENT WEIGHTS |
|---|---|---|
| A (WITCO TRS 40) | 335 | 273–440 |
| B (WITCO TRS 10-80) | 413 | 250–464 |
| C (WITCO TRS 18) | 495 | 353–640 |

Curve 1 of FIG. 1 represents a series of blends of samples A and B. The relative amounts of A and B was varied and the average equivalent weight of the blend was determined.

Curve 2 of FIG. 1 similarly represents a blend of samples A and C.

For each point on each curve, a series of samples were prepared using 2.0 weight percent of the petroleum sulfonate blend and varying the concentration of the solubilizing co-surfactant from about 0.05 to about 2.5, and the concentration of solubilizing co-surfactant needed to achieve borderline solubility for each blend was determined using electrical conductivity measurements according the method described above. This procedure was repeated for at least four blends of A and B and for at least four blends of A and C.

It is possible to prepare a blend of A and B or a blend of A and C having any desired average equivalent weight between about 335 and 413. For example, dashed line 3 of FIG. 1 represents an average equivalent weight of 375 and a blend of A and B having this average equivalent weight is found at point 4 where curve 1 intersects line 3. A blend of A and C exists at point 5 where line 3 intersects curve 2 having precisely the same average equivalent weight. It can be seen that while the average equivalent weights are the same for these two blends, the amount of solubilizing co-surfactant required for borderline solubility is not the same, since 1.25 percent solubilizer is required for blend 4 while only 0.72% solubilizer is required for borderline solubility of the same concentration of blend 5. Since the concentration of petroleum sulfonate is the same in blends 4 and 5 and blend 4 requires 42% less solubilizing co-surfactant, the cost per pound of which is about five times the cost of petroleum sulfonate, it is apparent that blend 5 is much more economical than blend 4.

The oil recovery efficiency cannot be determined directly from FIG. 1 and it is necessary to perform another series of tests to identify the particular blend of petroleum sulfonate which, when used in combination with the proper amount of solubilizing co-surfactant as determined above, will accomplish the maximum oil recovery in the particular field brine being tested. A series of oil displacement tests in cores or sand packs is performed using several different blends of organic sulfonate with the amount of solubilizing co-surfactant determined to be optimum for each individual blend as described above. Two series of runs were performed in this manner, one using various ratios of petroleum sulfonates A and B and another using various ratios of petroleum sulfonate samples A and C. The oil recovery efficiencies are depicted in FIG. 2 for both series of runs, with curve 6 representing oil recovery of a mixture of A and B with the ratio of A and B varied to produce blended samples having average equivalent weights from about 350 to about 450. The maximum oil recovery was obtained using a blend of A and B having an equivalent weight of about 370. Curve 7 relates the oil recovery efficiency of blends of A and C to the average equivalent weight of the blends, and the maximum oil recovery is realized using a blend of A and C having an average equivalent weight of about 380.

It can be seen from FIG. 2 that the oil recovery achieved using the optimum blend of A and B is only slightly superior to that attained using the optimum blend of A and C, and the average equivalent weight of the optimum A and B blend was about the same as the average equivalent weight of the optimum A + C blend. Moreover, the concentration of the A + C blend was exactly the same as the concentration of the A + B blend and the test conditions were the same. The most significant difference in the oil recovery results was that blend A + B required 1.25 percent solubilizing co-surfactant and blend A + C required only 0.72 percent of the same solubilizer. The 42% reduction in solubilizing co-surfactant required to solubilize blend A + C is very significant since the cost of solubilizing co-surfactant is much greater than the cost of petroleum sulfonates.

The results attained in the foregoing example are generally typical of the results obtained using the process of our invention in designing blended petroleum sulfonate plus alkyl or alkylaryl polyethoxy sulfonate solubilizers for use in highly saline and/or hard water environments. Optimum results are generally obtained using blends of petroleum sulfonates or other organic sulfonates in which at least one sample is a predominantly water soluble petroleum sulfonate, having an average equivalent weight less than 400 and preferably less than about 350 and at least one other petroleum sulfonate is at least partially oil soluble and has an equivalent weight greater than 400 and preferably greater than 450, but less than 600 and preferably less than 550.

It is very important to realize that both B and C are at least partly soluble while sample A is essentially all water soluble. Thus the particular blends of A + B and A + C tested for oil recovery are both a mixture of a water soluble and an oil soluble petroleum sulfonate, and the two blends have nearly the same average equivalent weight, yet the amount of solubilizing co-surfactant required to solubilize the same weight percent of the one of the two blends in the same brine is 42% greater than the amount required to solubilize the other blend.

Once the optimum blend and solubilizing co-surfactant are identified, a third series of oil recovery tests in cores or sand packs should be performed in which the total surfactant concentration is varied and the oil recovery efficiency as a function of total surfactant concentration is determined. For example, if it is determined that the optimum ratio of solubilizing co-surfactant to blended primary surfactant for a particular application is 0.4 in a series of tests using 2.0 percent petroleum sulfonate and 0.8 percent solubilizing surfactant (2.8 percent total surfactant concentration), oil recovery efficiency may be measured for surfactant fluids containing 2.0, 2.5, 3.0, and 3.5 percent total surfactant at the same concentration ratio to identify to total concentration which results in the maximum oil recovery.

Once the optimum blend, total concentration of surfactants and weight ratio of solubilizing co-surfactant to blended primary surfactant are identified as described above, the field procedure is similar to field practices commonly used for surfactant flooding operations. No fresh water preflush is ordinarily needed since the surfactants are tailored to operate optimally at the salinity and divalent ion concentration of the formation water. Sacrificial agents may be used to reduce surfactant adsorption if the particular formation being exploited adsorbs the surfactants to be used.

The surfactant fluid is preferably prepared in formation water or field water having a salinity and divalent ion concentration about equal to the formation water. The quantity of surfactant fluid utilized will generally be from 0.1 to 1.0 pore volume based on the pore volume of formation to be swept by the surfactant fluid. The surfactant fluid should be followed by injection of a mobility buffer, which is an aqueous solution of a hydrophilic, viscosity increasing polymer such as polyacrylamide or polysaccharide. Generally from 50 to 1000 parts per million polymer concentration is sufficient to produce a fluid having a viscosity greater than the formation petroleum viscosity, which is adequate to ensure efficient displacement. From 0.1 to 0.5 pore volumes of the viscous mobility buffer solution is used. This is in turn followed by injection of field water to displace all of the injected fluids and petroleum through the formations to the production well. Field water injection is continued until the oil cut of the produced fluid drops to an uneconomic level.

Thus, we have disclosed how the best blend of two or more organic sulfonates may be identified, and the optimum ratio of solubilizing co-surfactant to the blend of anionic surfactant such as a blend of at least two organic sulfonates samples, including petroleum sulfonates, may be determined in simple laboratory tests that are relatively quick and inexpensive to perform.

While some discussion of the mechanism and theory of operation of our invention has been included in the foregoing discussion, it was included only for the purpose of additional disclosure and it is not necessarily meant to imply that these are the only or even the primary mechanisms responsible for the proper functioning of our invention. Although we have disclosed our invention in terms of a number of illustrative embodiments, our invention is clearly not so limited since many variations thereof will be apparent to persons skilled in the art of enhanced oil recovery without departing from the true spirit and scope of our invention, and it is our desire and intention that our invention be limited and restricted only by those limitations and restrictions which appear in the claims appended immediately hereinafter below.

We claim:

1. In a method of recovering petroleum from a subterranean, petroleum-containing, permeable formation said formation also containing water of known or determinable salinity greater than 5000 parts per million total dissolved solids, said formation being penetrated by at least one injection well and by at least one production well, both wells being in fluid communication with the petroleum formation, comprising injecting an aqueous, saline surfactant-containing fluid into the formation via the injection well to displace and drive petroleum toward the production well from which it is recovered to the surface of the earth, said surfactant fluid comprising an aqueous fluid whose salinity is about equal to the salinity of the formation water and having dissolved therein surfactants comprising a mixture of at least two organic sulfonate primary anionic surfactants and at least one solubilizing co-surfactant, wherein the improvement comprises:

blending at least two anionic organic sulfonate surfactants at least one of which is predominantly water soluble and at least one which is at least partially oil soluble to form a blend which requires a minimum amount of solubilizing co-surfactant to achieve a condition of borderline solubility.

2. A method as recited in claim 1 wherein the organic sulfonate which is predominantly water soluble has an average equivalent weight less than 400.

3. A method as recited in claim 1 wherein the organic sulfonate which is predominantly water soluble has an equivalent weight less than about 350.

4. A method as recited in claim 1 wherein the organic sulfonate which is at least partially oil soluble has an average equivalent weight of at least 400 and not greater than 600.

5. A method as recited in claim 1 wherein the organic sulfonate which is at least partially oil soluble has an average equivalent weight of at least 450 and not greater than 550.

6. A method as recited in claim 1 wherein the solubilizing co-surfactant is selected from the group consisting of ethoxylated aliphatic compounds, ethoxylated alkylaryl compounds, alkyl or alkylarylpolyethoxy sulfates, alkyl or aliphatic polyethoxyalkyl sulfonates, alkylarylpolyethoxyalkyl sulfonates and mixtures thereof.

7. A method as recited in claim 6 wherein the solubilizing co-surfactant is an alkyl or alkylaryl polyethoxy sulfate.

8. A method as recited in claim 6 wherein the solubilizing co-surfactant is an alkyl or alkylarylpolyethoxyalkyl sulfate having the following structure:

$$RO(CH_2CH_2O)_nSO_3-M+$$

wherein R is an alkyl or alkylaryl group having from 8 to 20 carbon atoms in the alkyl chain, $n$ is an integer from 1 to 20, and M+ is a monovalent cation.

9. A method as recited in claim 6 wherein the solubilizing co-surfactant is an alkyl or alkyarylpolyethoxyalkyl sulfonate.

10. A method as recited in claim 9 wherein the solubilizing co-surfactant is an alkyl or alkylarylpolyethoxyalkyl sulfonate having the following structure:

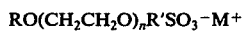

$$RO(CH_2CH_2O)_nR'SO_3-M+$$

wherein R is an alkyl or alkylaryl group having from 8 to 20 carbon atoms in the alkyl chain, $n$ is an integer from 1 to 20, R' is ethyl, propyl or hydroxypropyl, and M+ is a monovalent cation.

11. A method as recited in claim 1 wherein the blend of organic sulfonate surfactants which require the minimum amount of solubilizing co-surfactant is determined by preparing at least two series of at least 4 samples each from at least three organic sulfonate samples having different average equivalent weights, each sample having a total surfactant concentration between 1.0 and 4.0 percent and weight ratios of solubilizing co-surfactant to the blend of organic sulfonate surfactants of each series being varied from 0.1 to 1.0, measuring the electrical conductivities of the samples and identifying the ratios corresponding to the sample which produced the minimum electrical conductivities in each series and identifying the blend of organic sulfonates which require the minimum amount of solubilizing co-surfactant to achieve the condition of borderline solubility.

12. A method as recited in claim 11 comprising the additional steps of forming a graphical representation of electrical conductivity versus weight ratio of solubilizing co-surfactant to the blended primary anionic surfactant and identifying the minimum value of electrical conductivity on the graphical representation and the weight ratio of surfactants corresponding thereto.

13. A method of recovering petroleum from a subterranean, petroleum-containing permeable formation penetrated by at least two wells in fluid communication therewith, said formation containing water having a known or determinable salinity of at least 5000 parts per million total dissolved solids, comprising:
   introducing into the formation via one of said wells, an aqueous saline fluid having a salinity about equal to the salinity of the formation water, said surfactant fluid comprising a solubilizing co-surfactant and a blend of at least two organic sulfonates one of which is predominantly water soluble and one of which is at least partially oil soluble, the blend of two or more organic sulfonates being chosen from a group of at least two blends of at least three organic sulfonates having different average equivalent weights, the selected blend requiring less of the solubilizing co-surfactant than the other blends to achieve a condition of borderline solubility in the saline fluid.

14. A method as recited in claim 13 wherein the organic sulfonates are independently selected from the group consisting of petroleum sulfonate, alkyl sulfonate, alkylaryl sulfonates, and mixtures thereof.

15. A method as recited in claim 14 wherein the blend of organic sulfonates is a blend of petroleum sulfonates.

16. A method as recited in claim 13 wherein the solubilizing co-surfactant is selected from the group consisting of ethoxylated alkyl or alkylaryl compounds, alkyl or alkylaryl polyethoxy sulfates, alkyl or alkylaryl polyethoxyalkyl sulfonates, and mixtures thereof.

17. A method as recited in claim 16 wherein the solubilizing co-surfactant is an alkyl or alkylarylpolyethoxyalkyl sulfonate.

18. A method of recovering petroleum from a subterranean, petroleum-containing permeable formation, said formation containing water of known or determinable salinity and divalent ion concentration, said formation being penetrated by at least one injection well and one production well, both wells in fluid communication with the formation, comprising:
   a. preparing a first series of at least three samples comprising a first blend of two organic sulfonates in different weight ratios, one of the organic sulfonates being at least partially water soluble and one other of the organic sulfonates being at least partially oil soluble, the organic sulfonates having average equivalent weights which differ by at least 50;
   b. determining the minimum weight ratio of a preselected solubilizing co-surfactant selected from the group consisting of ethoxylated alkyl or alkylaryl compounds, alkyl or alkylarylpolyethoxy sulfates alkyl or alkylarylpolyethoxyalkyl sulfonates and mixtures thereof, required to solubilize each sample of the first series of blends of organic sulfonates in an aqueous fluid having a salinity about equal to the salinity of the formation water;
   c. preparing a second series of at least three samples of two organic sulfonates in different weight ratios, one of the organic sulfonates being at least partly water soluble and one other of the organic sulfonates being at least partly oil soluble, the average equivalent weights of the organic sulfonates differing by at least 50, at least one of the organic sulfonates of the second series having an average equivalent weight which differs from the corresponding organic sulfonate in the first series by at least 25;
   d. determining the minimum weight ratio of the same solubilizng co-surfactant as used in step (b) required to solubilize each sample of the second series of blends of organic sulfonates in an aqueous fluid having about the same salinity as was used in step (b);
   e. determining which series of blends of organic sulfonates require the lesser weight ratio of solubilizing co-surfactant for solubility in aqueous fluid having about the same salinity as the formation water;
   f. determining the concentration and weight ratio of the series of blended organic sulfonates identified in step (e) when used with the minimum weight ratio of solubilizing co-surfactant required for solubility at the salinity of the formation water which result in optimum oil recovery;
   g. preparing an aqueous saline surfactant-containing fluid comprising the preselected solubilizing co-surfactant and the organic sulfonate blend identified in step (e) above in the concentration and weight ratio determined in step (f) above having a salinity about equal to the salinity of the formation water;
   h. injecting the aqueous saline surfactant-containing fluid of step (f) into the petroleum containing formation via the injection well to displace the formation petroleum toward the production well; and
   i. recovering petroleum displaced by the surfactant-containing fluid from the formation via the production well.

19. A method as recited in claim 18 wherein at least one of the organic sulfonates in selected from the group consisting of petroleum sulfonate, aliphatic sulfonate, alkyl sulfonate, alkylaryl sulfonates and mixtures thereof.

20. A method as recited in claim 18 wherein the organic sulfonate which is at least partially water soluble used in the blend of step (g) has an average equivalent weight less than 400.

21. A method as recited in claim 20 wherein the organic sulfonate has an average equivalent weight less than about 350.

22. A method as recited in claim 18 wherein the organic sulfonate which is at least partly oil soluble present in the blend of step (g) has an average equivalent weight of at least 400 and not greater than 600.

23. A method as recited in claim 22 wherein the average equivalent weight of the organic sulfonate is at least 450 and not greater than 550.